United States Patent [19]

Ross et al.

[11] 4,413,513
[45] Nov. 8, 1983

[54] MACHINE FOR TESTING CHAIN AND SPROCKET TYPE DRIVE SYSTEMS

[76] Inventors: Michael O. Ross, 14111 Laterna La., Houston, Tex. 77083; Kurt M. Marshek, 9701 Courtleigh Cir., Austin, Tex. 78759

[21] Appl. No.: 268,759

[22] Filed: Jun. 1, 1981

[51] Int. Cl.³ ............................................ G01M 13/02
[52] U.S. Cl. ............................................ 73/162; 73/7
[58] Field of Search .................... 73/162, 9, 7, 10; 184/65

[56] References Cited

U.S. PATENT DOCUMENTS

| | | | |
|---|---|---|---|
| 2,280,462 | 4/1942 | Whiteley | 184/65 |
| 3,178,928 | 4/1965 | Howe | 73/10 |
| 3,360,977 | 1/1968 | Herman | 73/7 |
| 3,739,632 | 6/1973 | Miller | 73/162 |
| 4,274,278 | 6/1981 | Patterson | 73/162 |

FOREIGN PATENT DOCUMENTS 938383 10/1963 United Kingdom ............... 73/9

OTHER PUBLICATIONS

On Polygonal Action in Roller Chain Drives; *ASME Transactions*, vol. 87, Series, B, Nov. 2, 1965; Bouillon et al.

*Primary Examiner*—Charles E. Frankfort
*Assistant Examiner*—Denis E. Corr

[57] ABSTRACT

A machine for testing and comparing chains and sprokets of various geometries and materials comprising four sprockets and two chains and having a pneumatic cylinder for loading one chain against another. A motor which drives a rotatable fixed shaft which is mounted in two pillow block bearings. This shaft contains two sprockets. A second rotatable shaft is journalized in two pillow blocks mounted on a movable platform. Means are provided for applying a predetermined load through the movable platform to the second shaft and means are also provided for measuring the total cycle to chain-sprocket system failure. Means are also provided for determining chain load, for measuring chain and sprocket temperatures, for lubrication of the chains and sprockets, for cooling the test chamber, and for automatic machine shut off at failure.

10 Claims, 8 Drawing Figures

MACHINE FOR TESTING CHAIN AND SPROCKET TYPE DRIVE SYSTEMS

BACKGROUND OF THE INVENTION

This invention relates to new and useful improvements in machines for testing and comparing chain and sprocket geometries, materials, and lubricants. Moreover, the invention relates to a machine for testing and comparing not only chains and sprockets but also timing belts and timing belt pulleys of various materials and geometries. The machine also has versatility for using different lubrication systems and for simulating various environmental conditions. More particularly, the invention relates to a machine that employs a pneumatic system for applying force to the chain drive machine elements.

Chains and sprockets or timing belts and timing belt pulleys are used wherein the transmitted motion from one shaft to another needs to be in an exact ratio, such as for precise timing in various machines. Power capacity at various loads and speeds is a primary factor in selecting a roller chain and sprocket for a particular application. Power capacity for chains is generally expressed in terms of the number of teeth and rpm on the smallest sprocket running in mesh with the chain. Its power capacity is expressed for a given life, generally 10,000 hours, with a 180 degree angle of wrap. Sprocket rpm is measured using a strobotac. Chain speeds are normally expressed in feet per minute and computed as the product of the sprocket pitch circumference in inches times the revolutions per minute of said sprocket divided by 12. For chains operating under conditions of boundary lubrication, or dry lubrication, there is a direct relationship between the speed and load that can be carried by any chain material. The greater the load, the less the allowable speed, and conversely the greater the speed, the less the allowable load.

The present invention relates generally to the field of chain wear measurement or chain and sprocket fatigue testing and in particular to a method and apparatus for determining the power capacity of a chain and sprocket drive system for a given life. The method and apparatus also is used in measuring or testing the effectiveness of chain drive lubricants. Test machines for determining chain and sprocket system power capacity are known to the prior art. They generally operate by loading one chain strand against another through the application of an external force. This type of machine is described in the prior art as a four-square tester. Power is required only to overcome the frictional resistance in the machine itself.

While four-square machines are to some extent well known in the industry, these devices are inaccurate when measuring chain loads, speeds, and determining power capacities of chains and sprockets. Dynamic loads are not equal to loads applied to the chains; and sprocket misalignment is common. Furthermore, the known four-square machines generally employ weights in order to apply the external load or they utilize friction slides which distract from the accuracy of the chain and load measurement.

The present invention is directed to an advanced method and apparatus for measuring or testing horsepower capacity of chain drive systems, which overcome the disadvantages and drawbacks of known prior art techniques.

SUMMARY OF THE INVENTION

The present invention relates to a chain-sprocket drive measuring and testing apparatus which is compact, lightweight and capable of accurately determining the life and horsepower capacity of chain and sprocket drive systems. The present invention also relates to methods for measuring and testing chain wear and elongation.

In a specific embodiment, the inventive apparatus comprises an aluminum channel base frame, which sits, by gravity on a flat-level surface. A motor is mounted on the channel frame and serves to generate a torque on a fixed shaft which rotates and holds two sprockets. This torque is transmitted from the fixed shaft which holds the two said sprockets to a movable shaft which holds two mating sprockets via two separate chains, thereby urging the movable shaft sprockets to rotate. The load in the chains is determined using a strain gage mounted on a clevis fixture which is attached to the movable platform and the pneumatic cylinder rod. The inventive device includes a pneumatic reservoir and a pneumatic cylinder which applies the external load. Also provided is a system for determining the rotational speed and the total operating time of the movable shaft. The invention further includes a counter for determining the total number of sprocket revolutions during a given test period as well as a micro-switch and relay system for stopping the inventive machine should chain elongation exceed a certain amount or should chain or sprocket failure occur.

The invention further utilizes other size timing belts and timing pulleys to change the fixed shaft/motor speed ratio to establish other load-speed curves. Instrumentation is provided to display, record, and store elapsed time, rotations of the driven sprockets, and load in the chains.

It is accordingly an objective of the present invention to provide an improved method and apparatus for determining the power capacity and life of different chain and sprocket materials and geometries.

A further objective of the present invention is to provide an improved method and apparatus capable of producing chain wear elongation for various lubrication, load, and speed conditions.

Another object of the present invention is to provide an apparatus for measuring and determining chain and sprocket temperatures for various loads and speeds during operation.

Still a further objective of the present invention is to provide a wear measuring and power capacity determining apparatus which is precise and accurate in operation.

Yet another objective of the present invention is to provide a method and apparatus for determining chain or sprocket life for various environmental conditions.

Still a further object of the present invention is to provide an apparatus for determining chain and sprocket life which is not subject to misalignment and high dynamic loads which can produce erroneous results.

These and other objects of the present invention as well as that of the attendant advantages thereof, will become more readily apparent when reference is made to the following description, taken in accordance with the accompanying drawings.

DETAILED DESCRIPTION OF THE DRAWINGS

Figure 1:
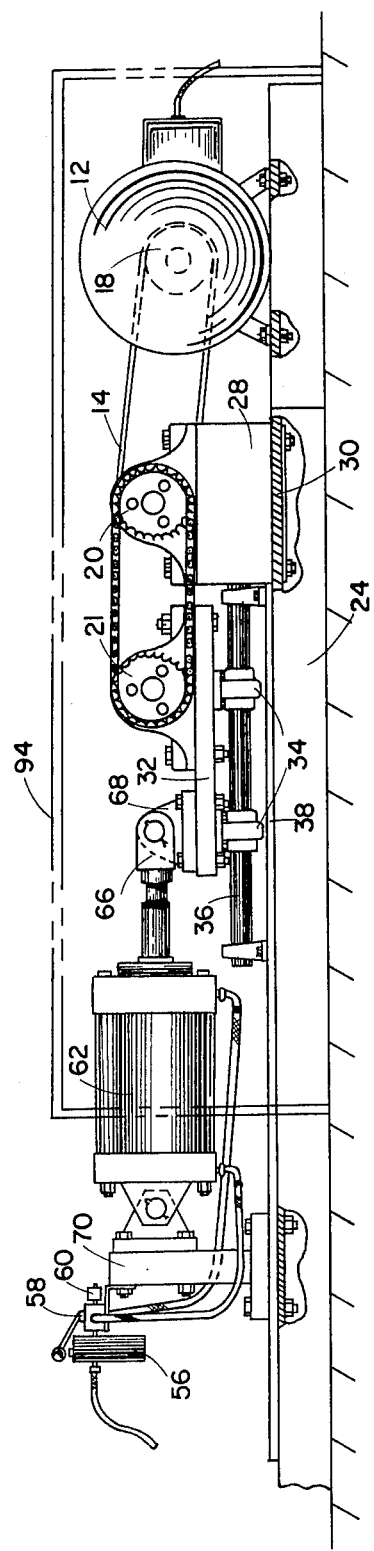
FIG. 1 is a front plan view of the inventive measuring and testing device.
Figure 2:
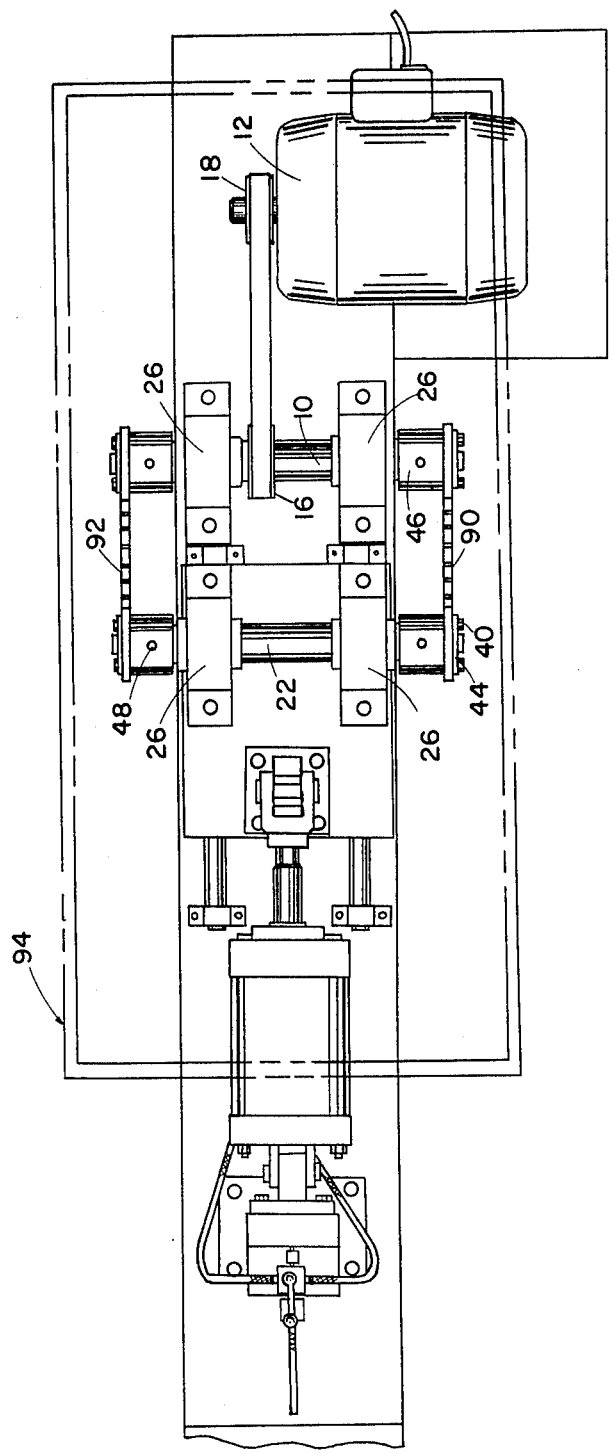
FIG. 2 is a top view of the inventive measuring and testing device.

With reference to FIGS. 1 and 2, the mechanical configuration of the inventive device for measuring and testing will be described. The drive system will be described first.

The driving sprocket shaft 10 is connected to a ten hp electric motor 12 through a timing belt 14 and a set of pulleys 16 and 18. The driving sprockets 20 located on shaft 10 are driven by the motor 12 and therefore turn the chain which is attached to the driven sprockets 21 located on movable shaft 22. The motor is attached directly to the channel base frame 24 with four bolts. The bolts pass through slotted holes in the motor base. This attachment scheme allows for motor movement to tighten the belt. The motor has a 1740 rpm speed that can be varied by selecting different size pulleys 16 and 18. An advantage of the four-square tester is that the motor need only provide enough power to overcome the frictional resistance in the bearings 26 and the sprocket-chain system. The 2.0 inch diameter stainless steel shafts 10 and 22 are each supported by two pillow block bearings.

The driving shaft pillow block bearings set on spacer blocks 28 which raise the shaft to the same height as the movable shaft 22. Long bolts, tightened by locknuts pass through the pillow blocks 26, spacker blocks 28, channel base frame 24, and bearing plate 30. The pillow block bearings hold the drive shaft 10 in place. The pillow blocks 26 of the movable shaft 22 are bolted to the linear bearing plate 32. Four linear bearings 34 run on two 1.0 inch stainless steel rails 36 and also mount to the linear bearing plate. The two rails are held in place on the adjustable plate 38 with four rail mounts. This allows horizontal movement of shaft 22 which is necessary for replacement of chains and sprockets. Each side of the adjustable plate 38 is attached to the channel base frame 24 with a series of five, ½ inch diameter bolts. Additional holes were drilled in the main channel base 24 to allow movement of the adjustable plate 38. This adjustment feature provides a center distance variation between sprockets of 10.0 to 22.0 inches. Three 5/16 inch bolts 40, on a 2.212 inch diameter bolt circle, were used in mounting the sprockets 20 and 21 between the stainless steel cover plates 44 and the stainless steel hubs 46. The four hubs 46 are spring pinned 48 to shafts 10 and 22. The spring pins which have a ½ inch diameter provide an easy means of hub attachment and would allow for hub replacement if a new design were required for future chain-sprocket investigations.

Figure 3:
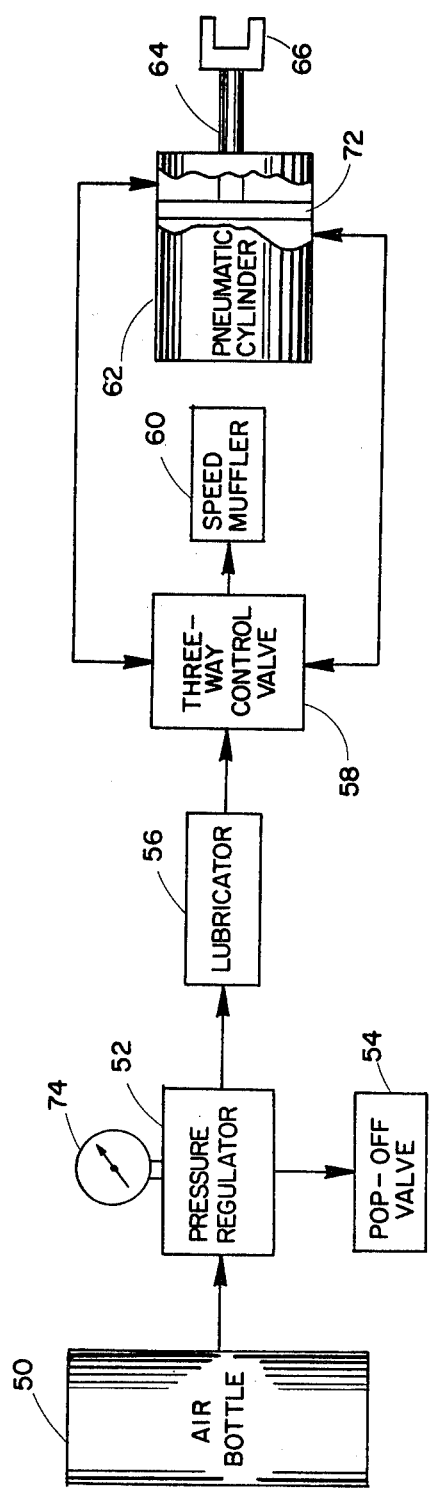
FIG. 3 is a block diagram of the pneumatic circuit which is useful with the inventive measuring and testing device.

With reference to FIGS. 1 through 3 the pneumatic system consists of a standard compressed air bottle (approximately 2200 psi initial pressure) 50, pressure regulator 52, pop-off valve 54, lubricator 56, three-way control valve 58, speed muffler 60, and a pneumatic cylinder 62 (6 inch dia. piston). Air flow through the lubricator 56 causes the release of a fine oil mist into the air. This oil mist is carried to the three-way control valve 58 and the pneumatic cylinder 62, where it lubricates the seals, preventing air leakage. The speed muffler 60 is connected to the exhaust port of the three-way control valve 58. The speed muffler controls the air flow exhausted to the environment.

The cylinder rod 64 is connected to the linear bearing plate 32 by a clevis end 66 and mating bracket 68. A special bracket 70 supports and ties the rear of the cylinder to the channel base frame 2. Equally spaced holes were drilled along the length of the main channel base 24 to allow movement of the adjustable plate 38. Four bolts hold the bracket 70 to the channel base. The three way valve 58 controls the positioning and loading of the pneumatic cylinder 62. Hoses connect the control valve 58 to the two ports on cylinder 62. The control valve 58 pressurizes either side of the piston 72 and drives the rod 64 forward and backward to respectively load and unload the chain. To position the cylinder rod 64 within its stroke length, the piston 72 is driven in the appropriate direction until it reaches the desired position. The control valve 58 is switched to the center position which directs the incoming flow of air to the speed muffler 60, leaving the cylinder rod 64, in a stationary position. The linear bearing rails 36 permit the cylinder rod 64 to displace its full 6.0 inch stroke length.

A hose connects the pressure regulator 52 on the bottle 50 to the lubricator 56. The lubricator 56 is attached directly to the three-way control valve 58. The pressure regulator 52 controls the pressure to the cylinder 62. A pressure gauge 74 on the regulator 52 indicates the line pressure. From this pressure reading, the total force that the cylinder will apply is estimated.

The pneumatic system, capable of handling pressures up to 250 psi was designed to insure safety to the operator of the machine. An adjustable pop-off valve 54 was installed on the pressure regulator 52. This valve 54, set slightly below 250 psi, dumps air directly to the environment and prevents damage to the system should the pressure regulator 52 fail.

Figure 4:
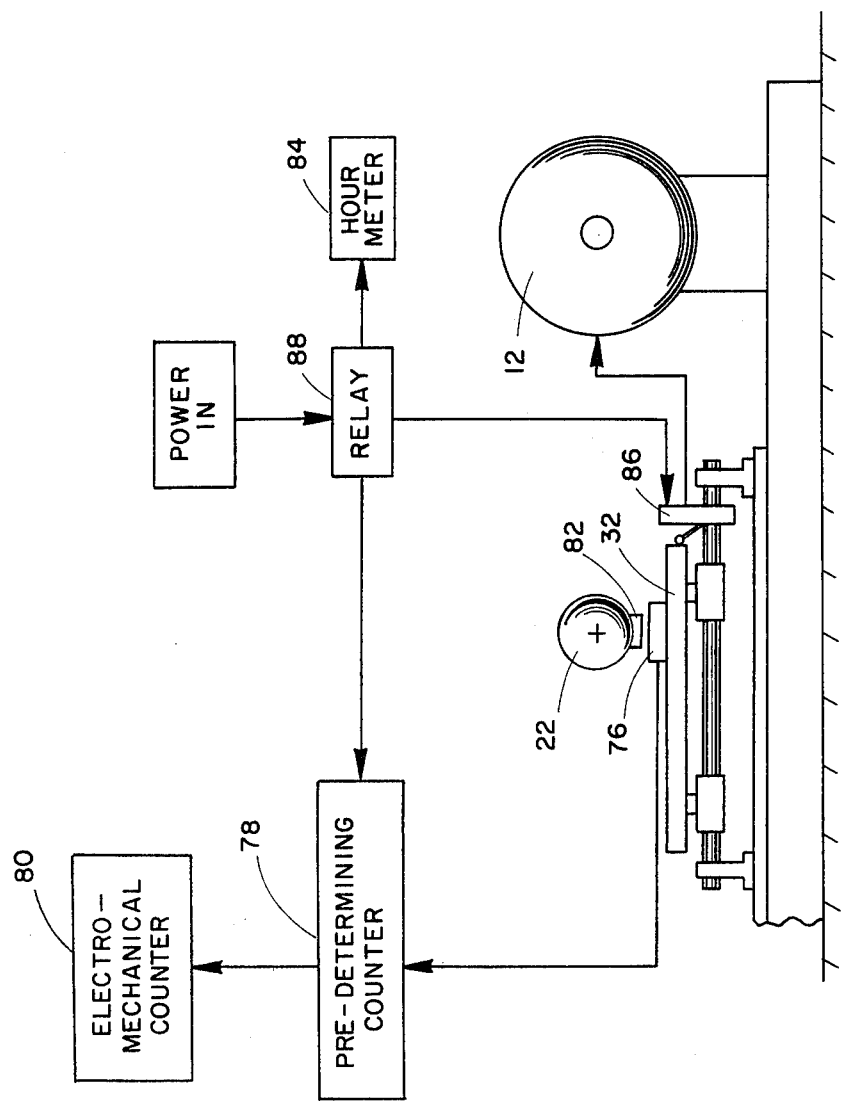
FIG. 4 is a block diagram of the electro-mechanical circuit and the electrical circuit useful with the inventive measuring and testing device.

With reference to FIGS. 1, 2, and 4, the counting system consists of a reed switch 76, predetermining counter 78, and an electro-mechanical counter 80. Since 1800 rpm (30 pulses per second) exceeds the capability of most electro-mechanical counters, a totally electronic pre-determining high cycle rate counter 78 was used. A magnet 82, midway between the pillow blocks 26, and attached to shaft 22 was used to make and break the contacts of a reed switch 76. The reed switch 76 was attached to the linear bearing plate 32 just below the shaft 22. The pre-determining counter 78 would count 10 cycles of the reed switch 76 and output one cycle to the electro-mechanical counter 80. The total count on the electro-mechanical counter 80 times ten would be the number of cycles or revolutions of the sprockets 20 and 21. An hour meter 84 was connected in series with the motor 12 to indicate the running time (hours) until failure. From this reading it could be determined whether the counter 80 had cycled through a complete count (turned over).

A micro-switch 86 was used to detect failure of the system. This off-on switch controlled the power to the motor 12 and counting system. The switch body clamped to a linear rail 36, and the switch trigger was held depressed against the end of the linear bearing plate 32. Failure of a chain-sprocket drive allowed movement of the linear bearing plate 32 toward the cylinder 62. A smaller movement was enough to disengage the trigger of the micro-switch 86 and disconnect power to the motor 12 and counting system. Thus constant supervision is not required, and the machine can operate 24 hours a day. A relay 88 located in the voltage line keeps the machine from being restarted after the micro-switch 86 has been disengaged. Resetting the relay 88 is necessary in order to restart the machine. The resetting feature insures that the micro-switch 86 will not reach an oscillatory point, where it could cycle the machine on and off.

The machine uses a preload principle, i.e., the tight side of each of the two chain strands 90 and 92 are loaded against one another through the shafts 10 and 22 via the pneumatic cylinder 62. Each chain 90 and 92 receives 50% of the total cylinder force. This method of loading quarantees a relatively constant chain force, even as the chains 90 and 92 elongate due to wear.

Figure 5:
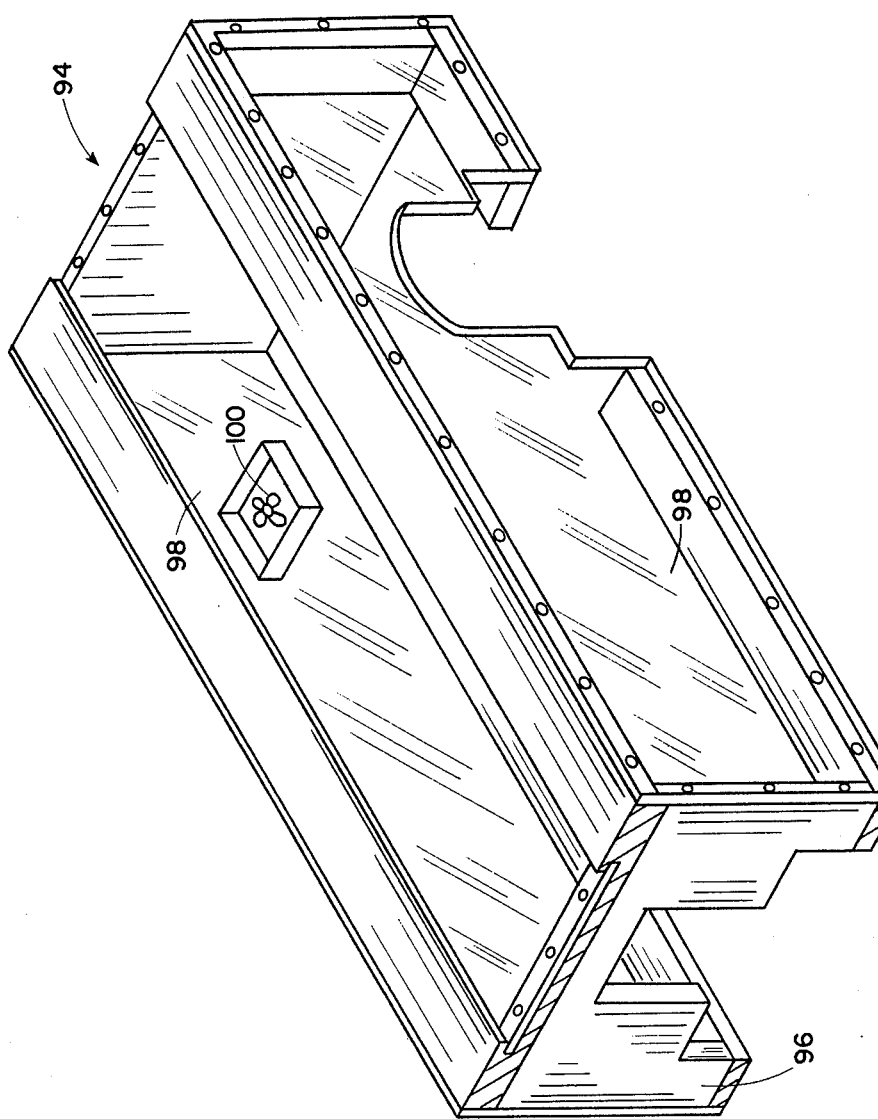
FIG. 5 is an isometric drawing of the safety cover useful with the inventive measuring and testing device.

With reference to FIGS. 1, 2, and 5 a safety cover 94 constructed of ¾ inch plywood and ¼ inch plexiglas, when fastened in place completely encloses the chain-sprocket drive as well as the timing belt 14 which supplies power to the sprockets on shaft 10. The wood portion 96 of the cover 94 surrounds the areas most likely to receive chain impact after failure. Plexiglas viewing areas 98 located on the sides and top of the cover allow observation of the sprockets 20 and 21 and chains 90 and 92. A small electric panel mount fan 100, installed in the top of the cover 94, draws air from the environment through the safety cover 94. The fan 100 forces air over the sprockets 20 and 21 and removes frictional heat energy.

Figure 6:
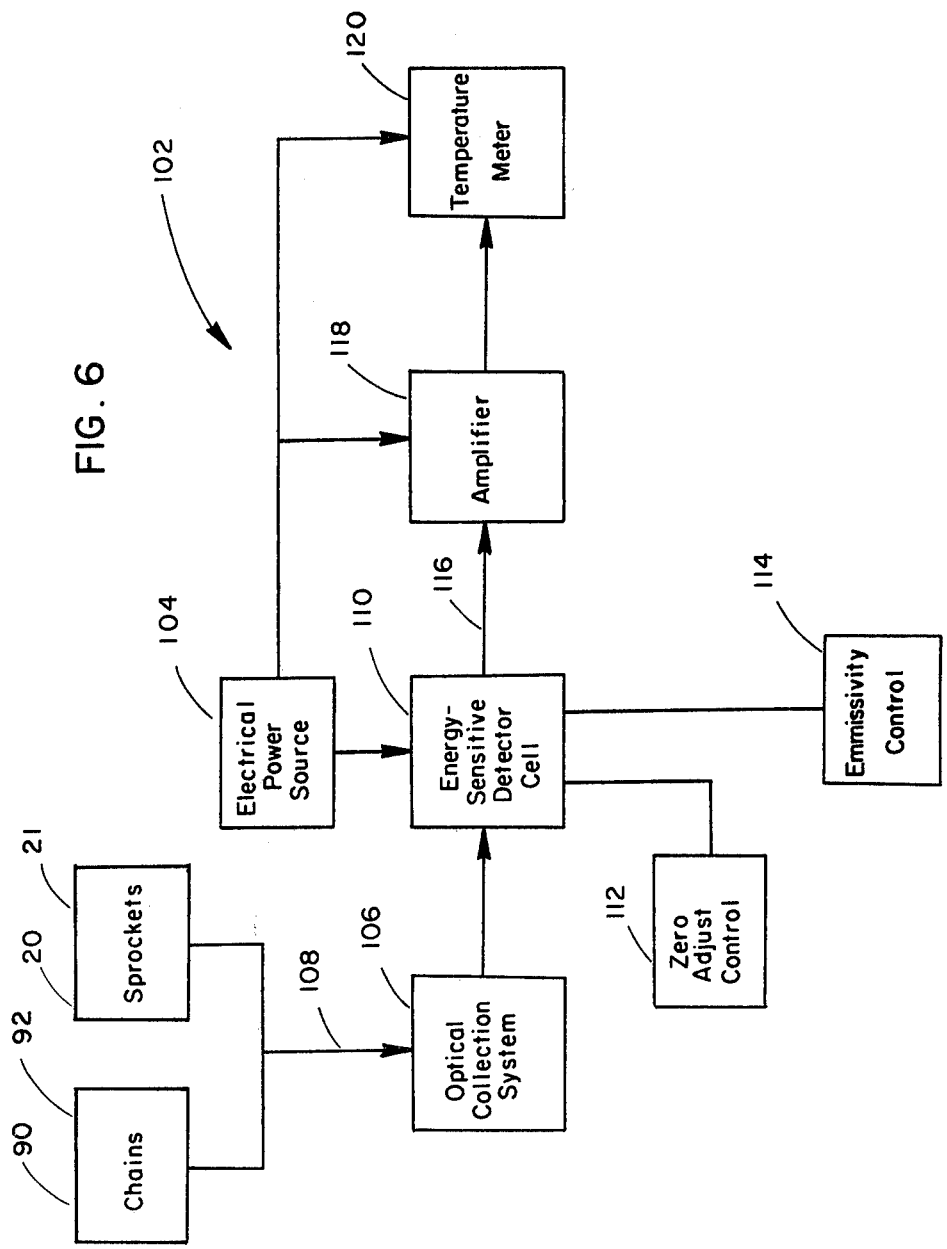
FIG. 6 is a block diagram of the infrared temperature measuring circuit useful with the inventive measuring and testing device.

FIG. 6 shows a block diagram of a temperature measurement system 102 useful with the inventive sprocket and chain test apparatus. In FIG. 6, an infrared temperature measuring system 102, powered by an electrical source 104, is used to obtain temperatures without contacting the chains 90 and 92 or sprockets 20 and 21. The optical system 106 collects infrared energy 108 given off by the surface of the chain 90 or 92 or sprocket 20 or 21 and directs it onto an energy sensitive detector cell 110. The detector cell 110 has both a zero adjustment control 112 and an emissivity control 114.

The zero adjustment 112 sets the initial temperature reading for a known infrared energy or surface temperature level. The emissivity control 114 compensates for emissivity effects, accounting for the fact that a black surface will radiate more infrared energy than a reflective surface at the same temperature. Chains 90 and 92 and sprockets 20 and 21 generally have emissivities lower than perfect black bodies and therefore emissivity control is required to obtain true temperature readings.

The electrical signal 116 from the energy sensitivity detector cell 110, is amplified by amplifier 118, and is transported to a large direct reading meter 120 which shows the temperature. The chains 90 and 92 and sprockets 20 and 21 radiate thermal energy due to molecular vibration. The intensity of this energy is a function of the material's temperature.

Figure 7:
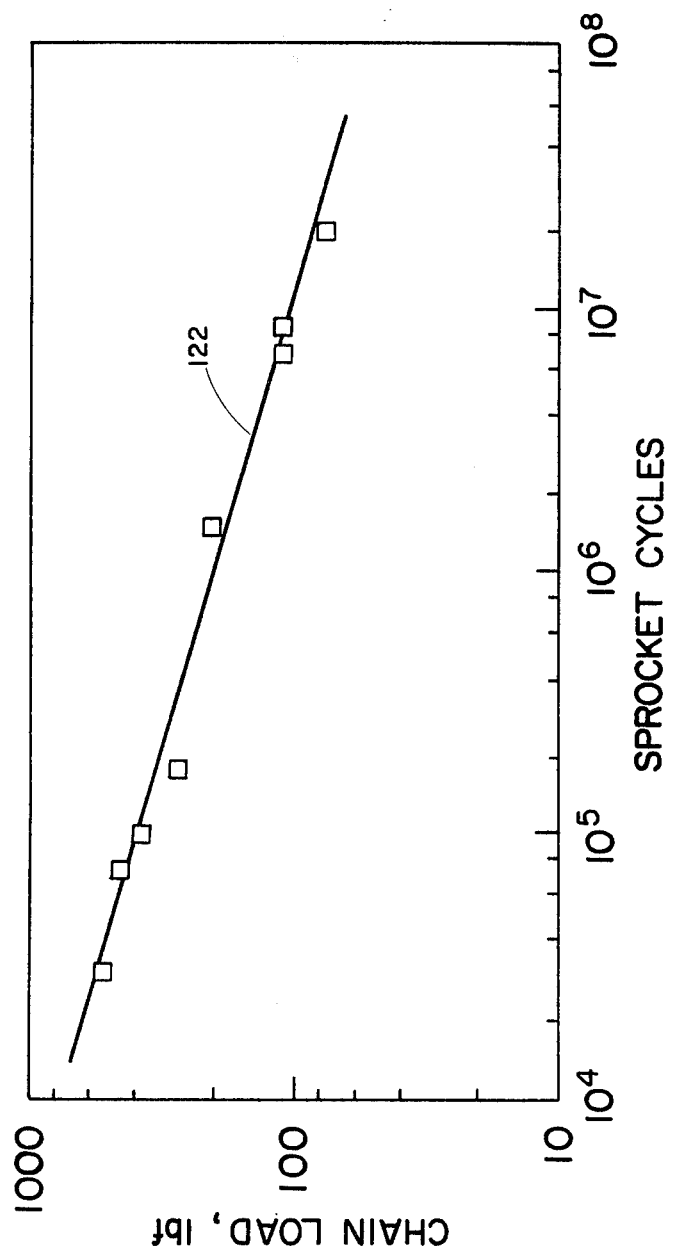
FIG. 7 is a curve of load capacity versus cycle life showing the test results from the inventive device operating in its power capacity determining mode.

FIG. 7 illustrates a load-cycle life curve which can be developed by utilizing the inventive apparatus. The ordinate represents the chain load force in each chain 90 and 92, while the abscissa represents the sprocket cycles until failure of either the sprockets 20 and 21 or the chains 90 and 92. Each test at a fixed chain load represents one point on the curve 122. It is, therefore, necessary to perform a series of tests to accurately define the load-cycle life curve 122. In any event, it should be appreciated that the illustrated curve 122 is merely representative. The shape of the curve depends upon the particular geometry and materials of the sprockets and chains, type of lubricant, lubrication method, and rotational speed.

Figure 8:
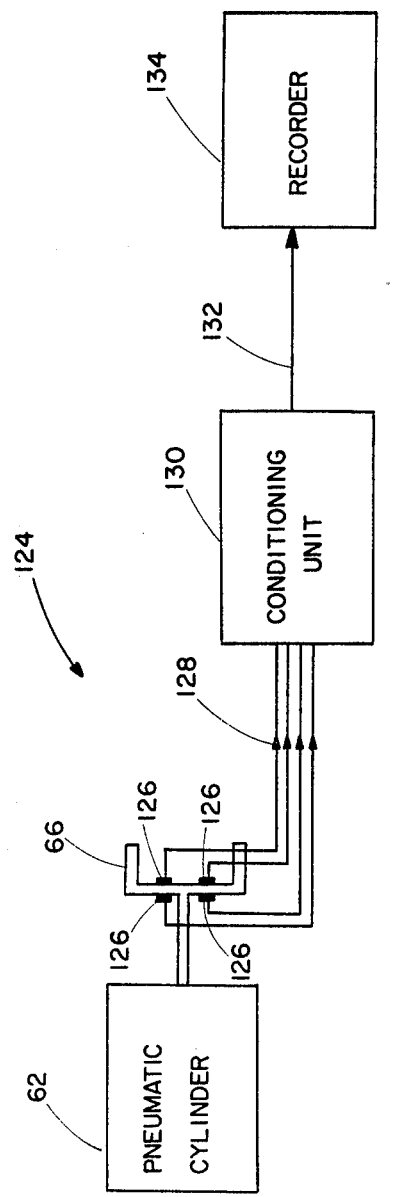
FIG. 8 is a block diagram of the chain load measuring circuit useful with the inventive measuring and testing device.

FIG. 8 shows a block diagram of a chain load measurement system 124 useful with the inventive apparatus. In FIG. 8, four strain gages 126 mount to clevis 66 forming the four legs of a Wheatstone bridge. Electrical signals 128 which are related to chain load are sent to conditioning unit 130. The conditioning unit 130 balances the bridge, provides the D.C. voltage input, and amplifies the output from the bridge. Signals 132 from the conditioning unit 130 are plotted on chart recorder 134.

Above, a specific embodiment of the present invention has been described. It should be appreciated, however that this embodiment was described for purposes of illustration only, without any intention of limiting the scope of the present invention. Rather, it is the intention that the present invention be limited not by the above but only as is defined by the appended claims.

What is claimed is:

1. An apparatus for measuring and testing chain wear elongation and determining power capacity of a chain-sprocket drive system and other transmission systems, the apparatus comprising a base frame which can indirectly support chains and sprockets under test; a driving sprocket shaft; a moveable sprocket shaft means; a cylinder mounted substantially parallel to the chains to apply load to said chain sprocket drive system; means for attaching said cylinder to the base frame; a linear bearing plate attached to said cylinder through which load is applicable to two test chains and four sprockets under test in one instance; a motor mounted on said base frame, having a rotatable shaft; means for coupling said rotatable motor shaft to a driving sprocket shaft for developing a torque on said driving sprocket shaft means urging the same to rotate relative to said base frame and can hence apply power to overcome friction in the chain-sprocket drive system under test; said torque being transmittable via the chains and sprockets between said driving sprocket shaft and a movable sprocket shaft means which permits rotation of said movable shaft to occur without rotation of said base frame; speed sensing means for sensing the rotational speed of sprockets; and counting system means for counting rotation of the said movable shaft located on said linear bearing plate and an elongation sensing switch to stop drive system operation of said drive system if chain elongation exceeds a fixed amount; a clevis and chain load measuring system comprised of strain gages which form a Wheatstone bridge and measure strain in said clevis through which load is applied to the chains; and a noncontact temperature measuring system to determine the temperature of chains and sprockets during operation; and a lubrication system comprised of a gravity feed and brush for wiping lubricant on the test chains and an environmental and safety cover for protecting the operation as well as for enclosing the chain drive system.

2. The apparatus recited in claim 1, wherein said lubrication system comprises a spray of lubricant applied in mist form on the moving chain or sprocket.

3. The apparatus recited in claim 1 wherein the load is applied with a hydraulic cylinder and accompanied with appropriate accessories, hoses and hydraulic power supply.

4. The apparatus recited in claim 1 wherein the load system consists of more than one pneumatic cylinder to load the chains and sprockets.

5. The apparatus recited in claim 1 wherein the four sprockets are mounted inside the bearings which hold the fixed and second shafts.

6. The apparatus recited in claim 1 wherein the chain elongation is measured, displayed and recorded during operation.

7. The apparatus recited in claim 1 wherein in the distance between sprocket shaft centers is 10 inches or greater.

8. An apparatus recited in claim 1, wherein the speed of rotation of the motor is controlled with an electronic controller.

9. The apparatus recited in claim 1, wherein the speed of the motor is unchanged and a transmission connecting said rotatable motor shaft to said driving sprocket shaft is used to change the driving sprocket shaft speed.

10. The apparatus recited in claim 1 wherein the chain load is determined by strain gaging the driving shaft.

* * * * *